April 22, 1924.

J. F. CREED 1,491,083

STEERING LOCK FOR AUTOMOBILES

Filed Jan. 12, 1923

INVENTOR
James F. Creed
BY
Clarke & Doolittle
ATTORNEYS

Patented Apr. 22, 1924.

1,491,083

UNITED STATES PATENT OFFICE.

JAMES F. CREED, OF PITTSBURGH, PENNSYLVANIA.

STEERING LOCK FOR AUTOMOBILES.

Application filed January 12, 1923. Serial No. 612,340.

*To all whom it may concern:*

Be it known that I, JAMES F. CREED, a citizen of the United States, residing at Pittsburgh, in the county of Allegheny and State of Pennsylvania, have invented certain new and useful Improvements in Steering Locks for Automobiles, of which the following is a specification.

This invention is for a lock for automobiles, and more particularly a device, which, when locked, will hold the front wheels of the automobile from being turned to steer the vehicle.

Various locks for the steering mechanism of automobiles have been devised, but most of these are applied to the steering post. The objection to these is that a thief may sit in the driver's seat with the appearance of belonging there while picking at or tampering with the lock.

The present invention has for its principal object to provide a lock mechanism of simple construction, carried at the front of the machine, so that anyone tampering with it must do so in a very conspicuous and noticeable manner, thereby immediately throwing him open to the suspicion of onlookers and watchmen or police.

The invention includes a casing secured to the front part of the vehicle, having bars therein which may be projected and retracted sideways into and out of engagement with the inner faces of the central part of the wheel by a simple mechanism enclosed within the casing. When projected to wheel engaging position, the front wheels may not be steered, and the parts may be locked in this position.

The invention may be more fully described by reference to the accompanying drawings, in which.

Figure 1:
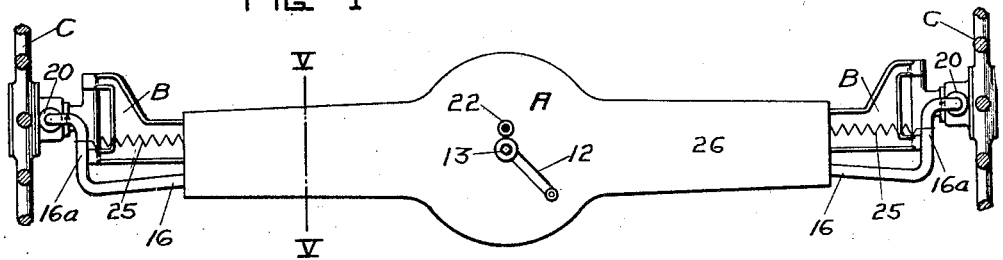
Fig. 1 shows a front elevation of the lock applied to a vehicle, only the front axle and parts of the vehicle wheels being shown.
Figure 2:
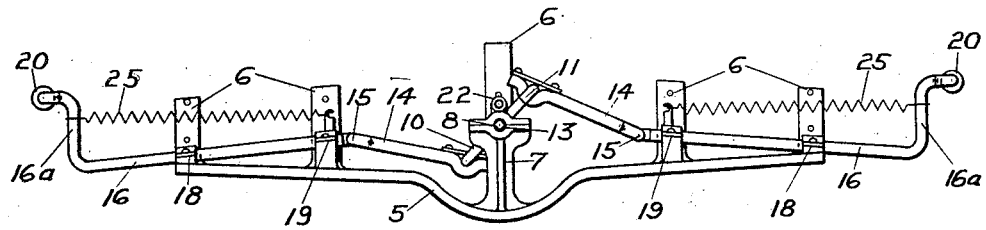
Fig. 2 is a similar view of the lock, with the casing removed.
Figure 3:
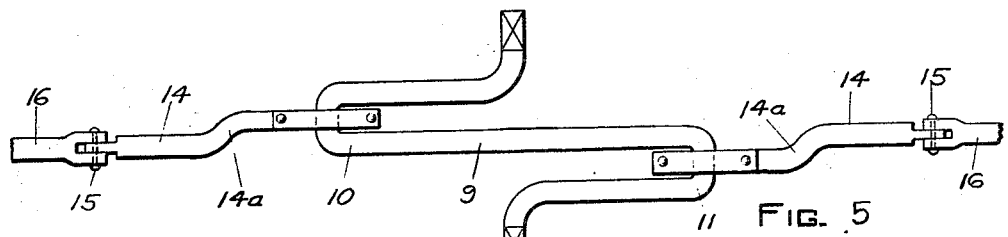
Fig. 3 is a top plan view of the rod moving mechanism.

In the drawings, A designates the lock generally, B is the front axle of a motor vehicle, and C designates the two front wheels mounted to turn on a vertical axis in the usual manner, to steer the vehicle.

The lock comprises a base 5 of suitable construction, such as cast aluminum or other metal, having vertical lugs 6 at the back thereof. Centrally disposed on the plate is a vertical post 7 having a bearing 8 formed at the top thereof. Having one end supported in bearing 8, and having the other end journalled in a bearing provided in the central lug 6, is a crank 9 having two eccentrics, 10 and 11. The forward end of the crank projects beyond the bearing and carries an operating crank or handle 12, which is preferably removable, the end of the crank shaft being squared, as indicated at 13, to cooperate with said handle.

Figure 4:
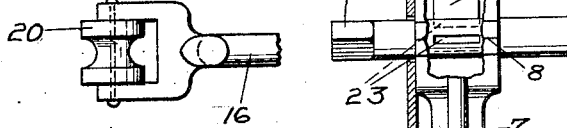
Fig. 4 is a detail view of the wheel engaging roller at the outer end of the locking rods.

Connected with each of the eccentrics 10 and 11 are pitmen 14. The outer end of each pitman connects at pivoted joint 15 with a reciprocable lock bar 16, which is guided in bearings 18 and 19, both bars being similar. Each bar is preferably offset at $16^a$, so that its terminal will be in proper relation to the central portion of the wheels. The end of each bar preferably carries a wheel engaging roller 20 having a circumferential groove therein, as clearly shown in Fig. 4.

It will be readily understood that, upon rotation of the crank through operating handle 12, the rod or lock bars may be reciprocated toward and from the wheels, both bars being extended or retracted simultaneously. Each of the pitmen 14 have an offset portion $14^a$ therein, in order that the rods 16 may be in substantial alinement.

Figures 5, 6:
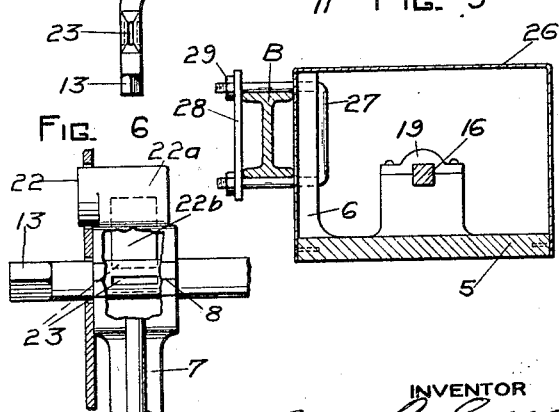
Fig. 5 is a transverse section in the plane of line V—V of Fig. 1.
Fig. 6 is a detail view of the lock for holding the parts against operation.

Mounted on the bearing 8 is a lock 22 of any known or preferred construction, a standard type of lock of well known design preferably being employed, this lock having the usual barrel $22^a$ (see Fig. 6) and a bolt $22^b$. The crank shaft is slotted or recessed at one or more points, as indicated at 23, and the bolt may be projected into one of such slots by operation of a key, as will be well understood.

At 25 are springs which connect the bars with a non-movable part of the frame, which springs tend to urge the bars to retracted position.

All of the operating mechanism is enclosed in a suitable casing 26, and the lock is secured to the front axle by U-bolts 27 which pass through lugs 6 and around the axle. A cross bar 28 connects the open ends of each U-bolt, and nuts 29 secure the U-bolts in place. These bolts are located in a rather hidden and inaccessible place, and for additional security, the ends of the U-bolts may be peened over to prevent removal of the nuts. End 13 of the crank and the lock are accessible for operation from the outside of the casing.

It is contemplated that the device be built in different sizes to meet such variations as are necessary in the different makes of cars. When applied to the front axle, it is contemplated that the rollers 20 may, by operation of the handle 12, be projected into a position where they will engage the hub portions of the wheels, and thus prevent the wheels from being turned to steer the vehicle, although they will not prevent the wheels from revolving, if any attempt is made to move the vehicle.

The circumferential grooves in the rollers enable the bolt or rivet heads on the wheels to clear the rollers, so that, if an attempt is made to move the car with the lock bars projected, no lateral strain will be put on the bars by reason of said bolt or rivet heads. It will also be noted that the bars 16 are preferably flat sided where they engage in the guides, as clearly shown in Fig. 5, to hold said bars against turning.

When the rollers are projected to locking position, the lock bolt 22$^b$ may be moved into locking position by a key in the possession of the operator. After being so locked, the key is, of course, removed, and the operating crank handle 12 may be removed and concealed.

When in retracted position, it is also desirable to lock the parts to prevent liability of the parts being moved by vibration, but to guard against this, the springs 25 are provided.

Various changes may be made in the construction of the lock within the contemplation of my invention and within the scope of the appended claims.

I claim as my invention:

1. A lock for automobiles comprising a support, a pair of reciprocable rods oppositely movable to and from locking position with relation to each other, a crank for effecting the simultaneous operation of said rods in opposite directions, a key lock for holding the parts in locked position, and a casing enclosing the crank and rods and through which the rods pass, said crank and lock being operable from without the casing.

2. A lock for automobiles comprising a support adapted to be secured to an automobile, a pair of reciprocable rods movable in opposite directions with relation to each other, wheel engaging means on the outer ends of said rods, a crank connected with said rods for effecting a movement thereof, means for locking the crank against movement, and a casing which houses said crank and lock and through which the reciprocable rods project, said crank and lock being operable upon the exterior of the casing.

3. A lock for automobiles comprising a casing, means on the casing for securing it to an automobile, a pair of reciprocable rods movable in opposite directions with relation to each other to and from locking position, a crank rotatably supported in said casing and operable from the exterior thereof, means connecting the crank and rods, and locking means accessible from the exterior of the casing for holding the crank against movement.

4. A lock for automobiles comprising a casing, a pair of rods slidably mounted in the casing, means rotatably mounted in the casing having diametrically opposite eccentric portions and operable from the outside of the casing for transmitting motion to said rods, and a lock for said rotatable means.

5. The combination with the front axle of an automobile having wheels thereon mounted to be turned on a vertical axis to steer the vehicle, of a lock for preventing said wheels from being so turned, said lock comprising a casing secured to the front axle, reciprocable bars mounted in the casing and having projecting end portions outside the casing, terminal means on said end portions for engagement with the hub of the wheels, means in said casing operable from the exterior thereof for moving said bars into and out of wheel engaging position, and means for locking said bars against movement.

In testimony whereof I affix my signature.

JAMES F. CREED.